United States Patent
Petzold

[11] Patent Number: 6,029,908
[45] Date of Patent: Feb. 29, 2000

[54] DEVICE FOR THE HEATING OF WASHING LIQUID OF A WINDSHIELD WIPER SYSTEM

[75] Inventor: Sven Petzold, Wiesbaden, Germany

[73] Assignee: Mannesmann VDO AG, Frankfurt, Germany

[21] Appl. No.: 09/059,049

[22] Filed: Apr. 9, 1998

[30] Foreign Application Priority Data

Apr. 12, 1997 [DE] Germany ............................ 197 15 359

[51] Int. Cl.[7] ................................ B05B 1/10; B05B 1/24
[52] U.S. Cl. ................................ 239/284.1; 239/284.2; 239/128; 239/130; 239/135
[58] Field of Search .................. 239/128, 130, 239/135, 284.1, 284.2

[56] References Cited

U.S. PATENT DOCUMENTS

| | | | |
|---|---|---|---|
| 3,122,322 | 2/1964 | Niemann et al. | 239/130 |
| 4,088,269 | 5/1978 | Schlick | 239/284.1 X |
| 4,090,668 | 5/1978 | Kochenour | 239/284.1 X |
| 4,248,383 | 2/1981 | Savage et al. | 239/284.2 |
| 4,323,266 | 4/1982 | Savage | 239/284.2 X |
| 4,324,363 | 4/1982 | Rauen, Jr. | 239/284.2 |
| 5,118,040 | 6/1992 | Abe | 239/284.1 |
| 5,181,658 | 1/1993 | Behar | 222/380 X |
| 5,509,606 | 4/1996 | Breithaupt et al. | 239/284.1 X |
| 5,558,258 | 9/1996 | Albini et al. | 222/380 X |

FOREIGN PATENT DOCUMENTS

| | | |
|---|---|---|
| 0456934 | 11/1991 | European Pat. Off. . |
| 0493334 | 7/1992 | European Pat. Off. . |
| 0745523 | 12/1996 | European Pat. Off. . |
| 1755495 | 8/1971 | Germany ............................ 239/284.1 |
| 2201681 | 7/1972 | Germany . |
| 8704903 | 5/1987 | Germany . |
| 4431629 | 3/1996 | Germany . |
| 9746431 | 12/1997 | WIPO . |

*Primary Examiner*—Andres Kashnikow
*Assistant Examiner*—Robin O. Evans
*Attorney, Agent, or Firm*—Martin A. Farber

[57] ABSTRACT

A device for heating washing liquid of a windshield wiper system of a motor vehicle has a heating device (11) provided with an electric resistance element (13) and developed for heating of a small amount of washing liquid intended for a small number of cleanings of a windshield, which amount of washing liquid is present in an intermediate storage (2). In this way, an amount of washing liquid sufficient for the cleaning of the windshield is available after only a short period of operation of the motor vehicle.

12 Claims, 2 Drawing Sheets

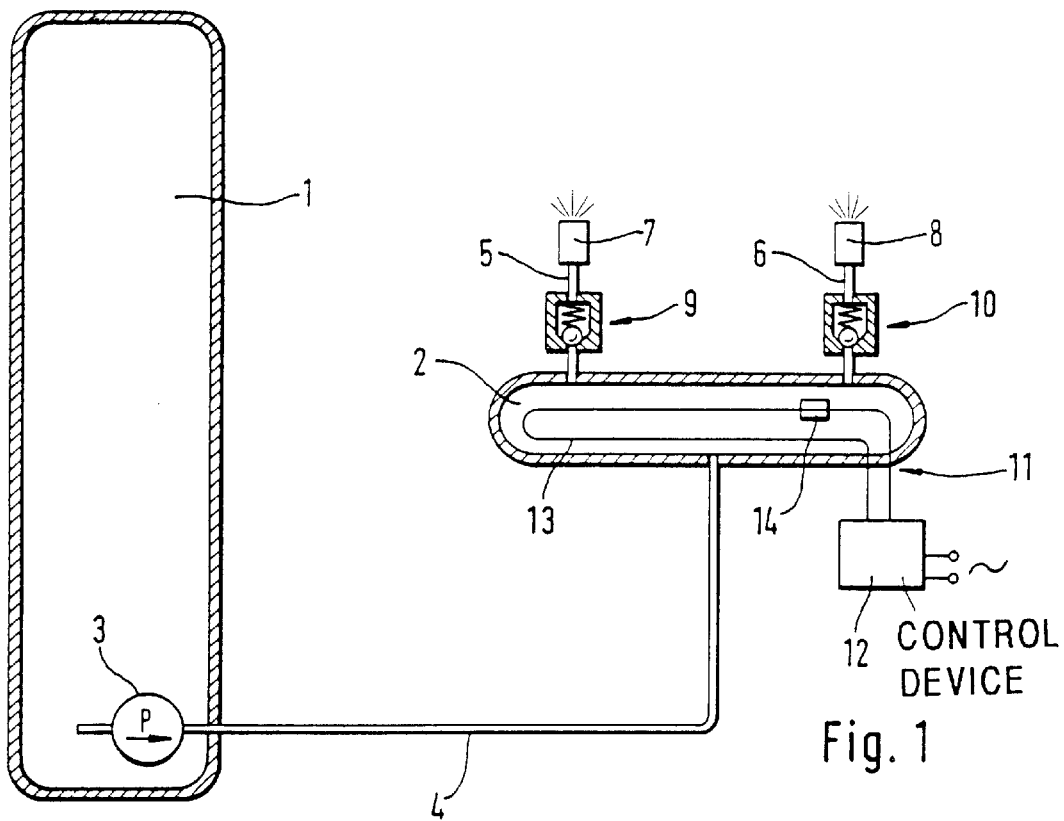
Fig. 1
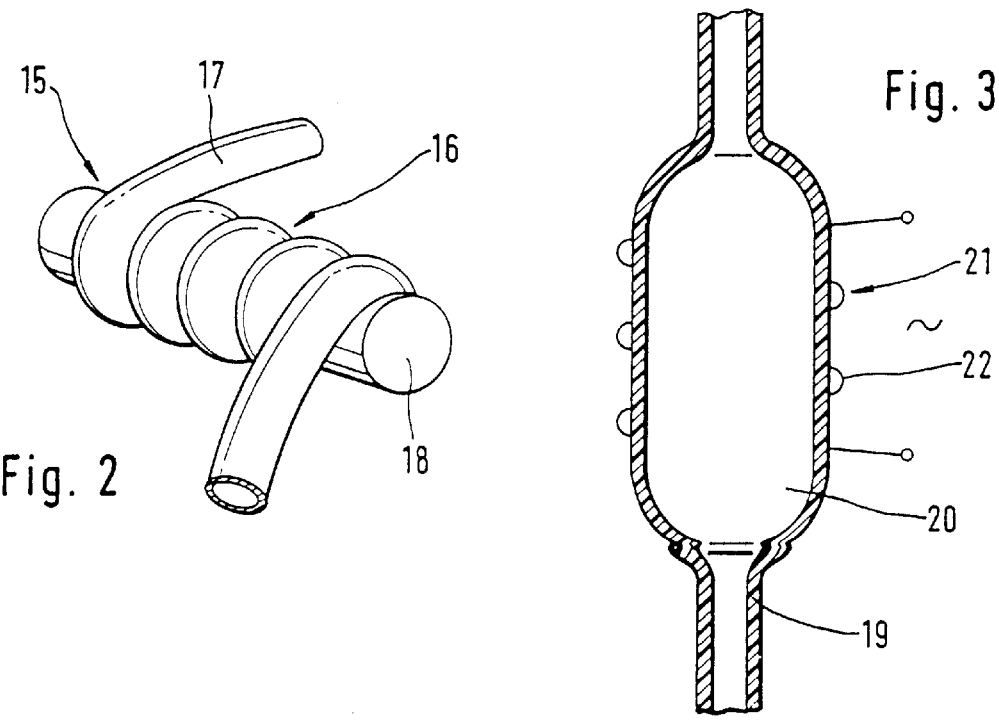
Fig. 2
Fig. 3

DEVICE FOR THE HEATING OF WASHING LIQUID OF A WINDSHIELD WIPER SYSTEM

FIELD AND BACKGROUND OF THE INVENTION

The present invention relates to a device for heating the washing liquid of a windshield wiper system, in particular a windshield washing system of a motor vehicle having a heating device.

Such devices are frequently employed in modern motor vehicles and are thus known. The device serves for heating the washing liquid. This is necessary since, in the event of low ambient temperatures, the washing liquid of the windshield wiper system tends to freeze even when antifreeze agents are present in the washing liquid. In one device known in actual practice, the heating means is developed as a counter-flow heat exchanger and is arranged in a washing-liquid line leading from a storage container to a washing nozzle. The counter-flow heat exchanger is used in a connecting thread of an oil drainage screw of an internal combustion engine of the motor vehicle and is heated by the motor oil of the internal combustion engine. The apparatus thus operates in a manner similar to a continuous flow heater and requires large heat transfer surfaces for the rapid transfer of the heat.

The known apparatus has the disadvantage that, despite large heat transfer surfaces, the heat exchanger is very slow. This has the result that, in the event of particularly low outside temperatures, an amount of washing liquid sufficient for cleaning of the windshield is available only after a long period of operation of the internal combustion engine. In order to obtain the smallest possible temperature difference between the motor oil and the washing liquid, it is furthermore necessary to make the heat transfer surfaces particularly large. The apparatus, however, is particularly large as a result of this.

SUMMARY OF THE INVENTION

It is an object of the invention so to develop a device of the aforementioned type that an amount of heated washing liquid for cleaning the windshield is available for the heating of the windshield within the shortest possible time.

According to the invention, the heating device (11, 18, 21) is developed for the heating of an amount of washing liquid intended for a small number of cleaning operations of a window (26), said amount of washing liquid being contained in an intermediate storage (2, 15, 20, 27).

As a result of this development of the invention, the heating device heats precisely the amount of washing liquid which is intended for the cleaning of the windshield. The amount of washing liquid present in the intermediate storage starts to be heated immediately upon turning-on of the heating device. In this way, the heat fed to the washing liquid is accumulated. The apparatus of the invention therefore requires only a relatively small, structurally simple, heat transfer surface as compared with the known apparatus for heating an amount of washing liquid intended for cleaning the window. It is essential that the washing system be arranged in a motor vehicle.

Internal combustion engines of modern motor vehicles as a rule have a high efficiency. Thus, an amount of heat necessary for heating the washing liquid is available after only a longer period of operation of the internal combustion engine. The washing liquid is heated particularly rapidly in accordance with an advantageous further development of the invention if the heating device (11, 21) has an electric heating system. Since, due to the invention, only a small amount of washing liquid is heated, the apparatus of the invention requires particularly little electrical energy. Furthermore, in this way, the apparatus of the invention is particularly simple in construction since no coupling places for a heater carrier of the internal combustion engine are necessary.

The heating device (11, 21) of the invention can be produced in a particularly cost-favorable manner if, in accordance with another advantageous further development of the invention, it has an electrical resistance element (13, 22).

The apparatus in accordance with the invention can be easily retrofitted in an existing windshield cleaning system if the intermediate storage (2, 15, 20) for the arrangement is provided in a washing-liquid line (5, 6, 17, 19) leading from a storage container (1) to a washing nozzle (7, 8).

An intermediate storage which is to be connected to the washing-liquid lines can, in accordance with another advantageous development of the invention, be avoided if a part of the washing-liquid line (17, 20) is developed as intermediate storage (15, 20). This development results in a further reduction of the cost of the manufacture and assembly of the intermediate storage. In the case of a washing-liquid line made of thermally deformable plastic, the part which is to be developed as an intermediate storage can be increased in cross section upon heating and thus the intended volume produced.

The intermediate storage can be produced, in a particularly economical manner, in accordance with another advantageous further development of the invention, if the washing-liquid line (17) has a wound region (16) with a number of turns corresponding to the storing of the intended amount of washing liquid.

The heat transfer from the heating device to the washing-liquid line requires a particularly small constructional expense in accordance with another advantageous further development of the invention if the turns of the washing-liquid line (17) are wound around the heating device (18). By this development, the apparatus in accordance with the invention can be assembled from a particularly small number of standard parts.

In the known apparatus, the washing liquid must be heated to a particularly high temperature since the washing liquid cools down greatly in the washing-liquid line between the oil drainage opening of the internal combustion engine and the wash nozzles. In accordance with another advantageous development of the invention, the washing liquid requires a particularly small feed of energy if the intermediate storage (2, 15, 20, 27) is provided for arrangement in the direct vicinity of the wash nozzles (7, 8, 25).

The assembling of the apparatus of the invention is particularly simple if the heating device (11, 18, 21) and/or the intermediate storage (2, 15, 20, 27) is provided for attachment to a part (24) of the body of the car having a receiver for the wash nozzle (7, 8, 25). In the simplest case, the wash nozzle and the intermediate storage can have a detent connection which passes through the receiver of the part of the wall of the body. In this way, the intermediate storage and the wash nozzle can be mounted simultaneously in a single operation.

The escaping of washing liquid from the intermediate storage can be avoided in particularly simple manner in accordance with another advantageous development of the invention if, arranged in a connection of the intermediate storage (2) for the washing-liquid line (5, 6) leading to the wash nozzle (7, 8), is a valve (9, 10) which opens above an intended pressure.

An apparatus intended for cleaning front windshields of modern motor vehicles frequently has at least two wash nozzles arranged at a distance from each other. In accordance with another advantageous embodiment of the invention, wash nozzles have only a single intermediate storage if the connections of the washing-liquid lines (5, 6) leading to the wash nozzles (7, 8) are each arranged on one end of the intermediate storage (2) and that a washing-liquid line (4) leading from the storage container (1) to the intermediate storage (2) is connected in the center of the intermediate storage (2). Furthermore, by the connection of the washing-liquid line leading from the storage container to the intermediate storage, a mixing of cold washing liquid fed from the storage container with the washing liquid which has already been heated is substantially avoided in the center of the intermediate storage. In this way, sufficiently hot washing liquid is present at all times available for the washing-liquid lines leading to the wash nozzles.

BRIEF DESCRIPTION OF THE DRAWINGS

With the above and other objects and advantages in view, the present invention will become more clearly understood in connection with the detailed description of preferred embodiments, when considered with the accompanying drawings of which:

FIG. 1 is a diagrammatic showing of a windshield wiping system having an apparatus in accordance with the invention;

FIG. 2 is a perspective view of an intermediate storage with a heating device of the apparatus in accordance with the invention;

FIG. 3 shows another embodiment of the apparatus in accordance with the invention in a sectional view.

DETAILED DESCRIPTION OF THE PREFERRED EMBODIMENTS

Figure 4:
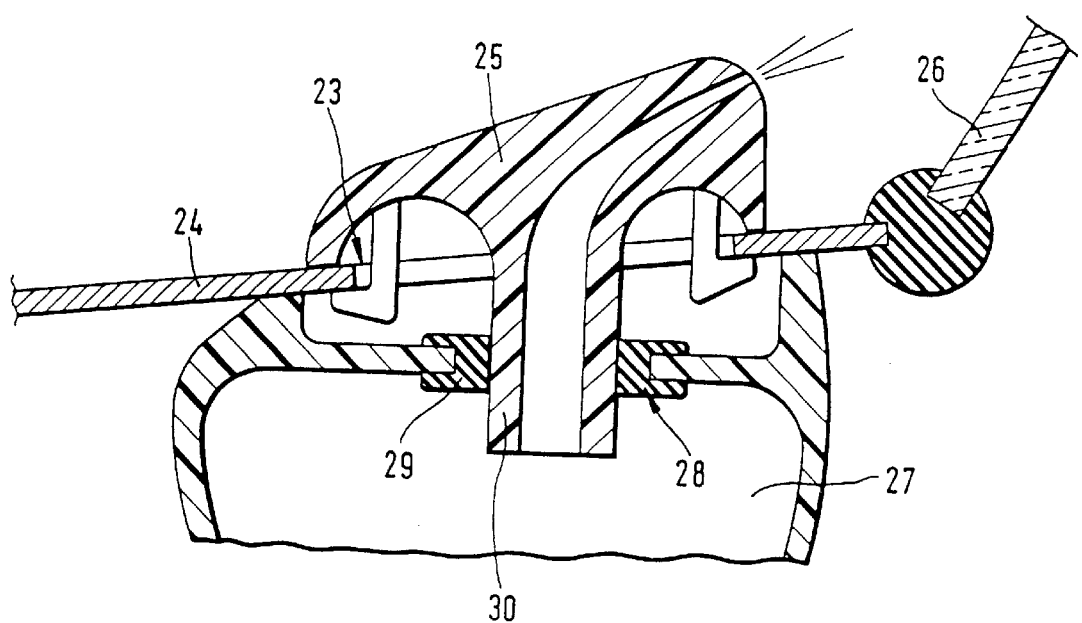
FIG. 4 is a sectional view of an upper region of an intermediate storage fastened to a part of the car body.

FIG. 1 shows a windshield washing system having a storage container 1 for washing liquid and having an intermediate storage 2. In the storage container 1 there is arranged a washing liquid pump 3 for pumping washing liquid via a washing-liquid line 4 into the intermediate storage 2. A washing-liquid line 5, 6 leads in each case from the intermediate storage 2 to two wash nozzles 7, 8. A valve 9, 10 is arranged in each case in the washing-liquid lines 5, 6 leading to the wash nozzles 7, 8. These valves 9, 10 open at a pressure above an intended pressure and thus prevent an escape of the washing liquid when the washing liquid pump 3 is disconnected. Furthermore, the valves 9, 10 serve as non-return valves and prevent the penetration of air through the wash nozzles 7, 8 into the intermediate storage 2. The intermediate storage 2 has a heating device 11 with an electric resistance element 13 supplied with electric current via a control device 12.

By the heating device 11, the washing liquid present in the intermediate storage 2 is heated in the case of low outside temperatures to an intended temperature of, for instance, 45° C. For this purpose, the heating device 11 has a thermostat 14 which is arranged within the intermediate storage 2. The intermediate storage 2 is dimensioned for storing water for a small number (e.g. less than about five) of cleaning operations for a windshield. Thus, the apparatus of the invention requires only particularly little electrical energy.

FIG. 2 shows an intermediate storage 15 having a wound region 16 of a washing-liquid line 17. The intermediate storage 15 has a number of turns corresponding to the storage of the intended amount of washing liquid. As an example of an indication of a plurality of turns, only four turns are shown in FIG. 2. The washing-liquid line 17 is wound on a bar-shaped heating device 18. The heating device 18 can have, for instance, an electric heating (not shown). This development of the intermediate storage 15 prevents a mixing of already heated washing liquid with cold washing liquid.

FIG. 3 shows an intermediate storage 20 made in a single piece with a washing-liquid line 19. In the case of a washing-liquid line 19 made of a thermally deformable plastic, the intermediate storage 20 can be made, for instance, by blow molding. On the outside of the intermediate storage 20 there is arranged a heating device 21 having an electric resistance element 22.

FIG. 4 shows a wash nozzle 25 fastened in a recess 23 in a body plate 24 of a motor vehicle. The body plate 24 is arranged directly in front of a window 26 to be cleaned (for instance, a windshield of a motor vehicle or a dispersion disk or glass of the headlight of a vehicle). On the side of the body plate 24 facing away from the wash nozzle 25 an intermediate storage 27 is arranged. The intermediate storage 27 has an opening 28 into which a packing ring 29 made of a rubber-like material is inserted. The packing ring 29 serves for sealing-off of a shank 30 of the wash nozzle 25. In this way, the intermediate storage 27 is arranged as close as possible to the wash nozzle 25. Since the wash nozzle 25 is arranged here above the intermediate storage 27, a valve intended to prevent the penetration of air through the wash nozzle 25 into the intermediate storage 27 can be arranged in a feed (not shown) to the intermediate storage 27.

I claim:

1. A device for heating washing liquid of a windshield wiper system, particularly a windshield washing system of a motor vehicle, comprising;

an intermediate storage having a size capable of holding only an amount of the washing liquid intended for a small number of cleaning operations of the windshield;

a heating device for heating of said amount of washing liquid intended for the small number of cleaning operations;

a wash nozzle adjacent the windshield;

wherein said intermediate storage is arranged in a direct vicinity of said wash nozzle;

a part of a body of the vehicle has a receiver for the wash nozzle; and said heating device and/or said intermediate storage is attachable to said part.

2. A device according to claim 1, wherein the heating device has an electric heating system.

3. A device according to claim 2, wherein the heating device has an electrical resistance element.

4. A device according to claim 1, further comprising a storage container for the washing liquid, a wash nozzle adjacent the windshield of the vehicle, a washing-liquid line leading from said storage container to said wash nozzle, and wherein said intermediate storage is connected to said washing-liquid line.

5. A device according to claim 4, wherein
a portion of the washing-liquid line is formed as said intermediate storage.

6. A device according to claim 5, wherein the washing-liquid line has a wound region with a number of turns having a volume corresponding to and for storing of the intended amount of the washing liquid.

7. A device according to claim 6, wherein said turns of the washing-liquid line are wound around said heating device.

8. A device for heating washing liquid in a washing system of a motor vehicle, according to claim 1, further comprising
a storage container for holding the washing liquid, and
wherein said heating device also heats said intermediate storage.

9. A device according to claim 1, wherein said wash nozzle is located on said intermediate storage.

10. A device according to claim 1, further comprising
a wash nozzle adjacent the windshield of the vehicle,
a washing-liquid line,
a connection of the intermediate storage for the washing-liquid line leads to the wash nozzle, and
a valve, which opens above a predetermined pressure, is arranged in said connection.

11. A device according to claim 1, further comprising
a storage container for holding the washing liquid,
at least two wash nozzles arranged at a distance from each other adjacent the windshield,
washing-liquid lines,
connections of the washing-liquid lines leading to the wash nozzles being each arranged on one end of said intermediate storage, and
another washing-liquid line leading from said storage container to said intermediate storage being connected in a center of the intermnediate storage.

12. A device according to claim 1, further comprising
a storage container for holding the washing liquid,
a washing-liquid line connected to said storage container, said washing-liquid line is thermally deformable and has an enlarged portion forming said intermediate storage, and
said heating device is wound around said intermediate storage.

* * * * *